United States Patent
Buffa et al.

(10) Patent No.: US 9,403,918 B2
(45) Date of Patent: Aug. 2, 2016

(54) OXIDIZED DERIVATIVE OF HYALURONIC ACID, A METHOD OF PREPARATION THEREOF AND A METHOD OF MODIFICATION THEREOF

(75) Inventors: Radovan Buffa, Humenne (SK); Sofiane Kettou, Uherske Hradiste (CZ); Lucie Pospisilova, Svitavy (CZ); Miroslava Berkova, Chocen (CZ); Vladimir Velebny, Zamberk (CZ)

(73) Assignee: Contipro Pharma a.s., Dolni Dobrouc (CZ)

( * ) Notice: Subject to any disclaimer, the term of this patent is extended or adjusted under 35 U.S.C. 154(b) by 708 days.

(21) Appl. No.: 13/514,759

(22) PCT Filed: Dec. 10, 2010

(86) PCT No.: PCT/CZ2010/000128
§ 371 (c)(1),
(2), (4) Date: Jun. 8, 2012

(87) PCT Pub. No.: WO2011/069474
PCT Pub. Date: Jun. 16, 2011

(65) Prior Publication Data
US 2012/0245323 A1  Sep. 27, 2012

(30) Foreign Application Priority Data
Dec. 11, 2009  (CZ) .............................. PV 2009-836

(51) Int. Cl.
*C08B 37/00* (2006.01)
*C08B 37/08* (2006.01)

(52) U.S. Cl.
CPC .................................. *C08B 37/0072* (2013.01)

(58) Field of Classification Search
CPC .................................................. C08B 37/0072
USPC ....................................... 536/55.2, 55.3, 124
See application file for complete search history.

(56) References Cited

U.S. PATENT DOCUMENTS

| | | | |
|---|---|---|---|
| 3,720,662 A | 3/1973 | Tessler et al. | |
| 3,728,223 A | 4/1973 | Kaneko et al. | |
| 4,205,025 A | 5/1980 | Hart et al. | |
| 4,258,134 A | 3/1981 | Yoshida et al. | |
| 4,713,448 A | 12/1987 | Balazs et al. | |
| 4,761,401 A | 8/1988 | Couchman et al. | |
| 4,851,521 A | 7/1989 | Della Valle et al. | |
| 4,965,353 A | 10/1990 | Della Valle et al. | |
| 5,455,349 A | 10/1995 | Grasshoff et al. | |
| 5,520,916 A | 5/1996 | Dorigatti et al. | |
| 5,550,225 A | 8/1996 | Philippe | |
| 5,616,568 A | 4/1997 | Pouyani et al. | |
| 5,658,582 A | 8/1997 | Dorigatti et al. | |
| 5,676,964 A | 10/1997 | Della Valle et al. | |
| 5,690,961 A | 11/1997 | Nguyen | |
| 5,824,335 A | 10/1998 | Dorigatti et al. | |
| 5,868,973 A | 2/1999 | Muller et al. | |
| 6,025,444 A | 2/2000 | Waki et al. | |
| 6,075,066 A | 6/2000 | Matsuda et al. | |
| 6,288,043 B1 * | 9/2001 | Spiro et al. ....................... 514/54 |
| 6,509,039 B1 | 1/2003 | Nies | |
| 6,613,897 B1 | 9/2003 | Yatsuka et al. | |
| 6,632,802 B2 | 10/2003 | Bellini et al. | |
| 6,673,919 B2 | 1/2004 | Yui et al. | |
| 6,683,064 B2 | 1/2004 | Thompson et al. | |
| 6,719,986 B1 | 4/2004 | Wohlrab et al. | |
| 6,902,548 B1 | 6/2005 | Schuler et al. | |
| 6,953,784 B2 | 10/2005 | Thompson et al. | |
| 7,214,759 B2 * | 5/2007 | Pacetti et al. ................. 528/190 |
| 7,550,136 B2 | 6/2009 | Warner et al. | |
| 7,680,038 B1 | 3/2010 | Gourlay | |
| 2002/0026039 A1 | 2/2002 | Bellini et al. | |
| 2002/0076810 A1 | 6/2002 | Radice et al. | |
| 2003/0163073 A1 | 8/2003 | Effing et al. | |

(Continued)

FOREIGN PATENT DOCUMENTS

| CA | 2512730 A1 | 7/2004 |
|---|---|---|
| CH | 628088 A5 | 2/1982 |

(Continued)

OTHER PUBLICATIONS

Jiang B., et al., "Study on TEMPO-Mediated Selective Oxidation of Hyaluronan and the Effects of Salt on the Reaction Kinetics," Carbohydrate Research, vol. 327, No. 4, pp. 455-461 (Aug. 7, 2000).
Prestwich, Glenn D., internet article "Biomaterials from Chemicallly-Modified Hyaluronan," (Feb. 26, 2001).
Angelin, et al., "Direct, Mild, and Selective Synthesis of Unprotected Dialdo-Glycosides," European Journal of Organic Chemistry, pp. 4323-4326 (Jan. 1, 2006).
Cornwell, et al., "A One-Step Synthesis of Cyclodextrin Monoaldehydes," Tetrahedron Letters, vol. 36, No. 46, pp. 8371-8374 (Nov. 13, 1995).
Ding B., et al., "TEMPO-Mediated Selective Oxidation of Substituted Polysaccharides—an Efficient Approach for the Determination of the Degree of Substitution at C-6," Carbohydrate Research, vol. 343, No. 18, pp. 3112-3116 (Dec. 8, 2008).

(Continued)

*Primary Examiner* — Patrick Lewis
*Assistant Examiner* — Everett White
(74) *Attorney, Agent, or Firm* — Wood, Herron & Evans, L.L.P.

(57) ABSTRACT

The invention relates to a hyaluronic acid derivative and methods of preparation and modification of a hyaluronan derivative with an aldehydic group in the position (6) of the polysaccharide glucosamine part. The oxidation of the hyaluronic acid can be performed by means of Dess-Martin periodinane (DMP) agent. The prepared aldehyde can be used for binding amine, diamine, amino acid, peptide and other compounds containing an amino group, e.g. by means of the reductive amination with $NaBH_3CN$ in water or in a water-organic solvent system. When a diamine or compounds containing three or more amino groups are used, cross-linked hyaluronan derivatives can be prepared. Cross-linked derivatives can also be prepared by the reaction of the aldehyde with a hyaluronan substituted by an amino-alkyl group HA-alkyl-$NH_2$.

13 Claims, No Drawings

(56) References Cited

U.S. PATENT DOCUMENTS

| | | |
|---|---|---|
| 2003/0205839 A1 | 11/2003 | Bachrach |
| 2004/0101546 A1 | 5/2004 | Gorman et al. |
| 2004/0192643 A1 | 9/2004 | Pressato et al. |
| 2005/0266546 A1 | 12/2005 | Warner et al. |
| 2006/0046590 A1 | 3/2006 | Chu et al. |
| 2006/0084759 A1 | 4/2006 | Calabro et al. |
| 2006/0189516 A1 | 8/2006 | Yang et al. |
| 2006/0281912 A1 | 12/2006 | James et al. |
| 2007/0149441 A1 | 6/2007 | Aeschlimann et al. |
| 2007/0202084 A1 | 8/2007 | Sadozai et al. |
| 2008/0063617 A1 | 3/2008 | Abrahams et al. |
| 2008/0124395 A1 | 5/2008 | Chen et al. |
| 2009/0252810 A1 | 10/2009 | Tommeraas et al. |
| 2010/0172892 A1 | 7/2010 | Uvarkina et al. |
| 2010/0247908 A1 | 9/2010 | Velev et al. |
| 2010/0310631 A1 | 12/2010 | Domard et al. |
| 2010/0310853 A1 | 12/2010 | Schwiegk et al. |
| 2010/0316682 A1 | 12/2010 | Chen et al. |
| 2011/0200676 A1 | 8/2011 | Lin et al. |
| 2011/0263724 A1 | 10/2011 | Gurtner et al. |
| 2012/0245323 A1 | 9/2012 | Buffa et al. |
| 2012/0264913 A1 | 10/2012 | Buffa et al. |

FOREIGN PATENT DOCUMENTS

| | | |
|---|---|---|
| CN | 101897976 A | 12/2010 |
| CN | 102154738 A | 8/2011 |
| CZ | 2006605 A3 | 4/2008 |
| CZ | 20070299 A3 | 2/2009 |
| CZ | 301899 B6 | 7/2010 |
| CZ | 302503 B6 | 6/2011 |
| CZ | 302504 B6 | 6/2011 |
| CZ | 302856 B6 | 12/2011 |
| CZ | 302994 B6 | 2/2012 |
| CZ | 20101001 A3 | 2/2012 |
| CZ | 20120537 A3 | 3/2014 |
| DE | 10331342 A1 | 2/2005 |
| EP | 0161887 A2 | 11/1985 |
| EP | 0216453 A2 | 4/1987 |
| EP | 0763754 A2 | 3/1997 |
| EP | 0554898 B1 | 5/1997 |
| EP | 1369441 A1 | 12/2003 |
| EP | 1454913 A1 | 9/2004 |
| EP | 1115433 B1 | 12/2004 |
| EP | 1538166 A1 | 6/2005 |
| EP | 1217008 B1 | 3/2006 |
| EP | 1826274 A1 | 8/2007 |
| EP | 1905456 A1 | 4/2008 |
| EP | 1607405 B1 | 5/2011 |
| EP | 2399940 A2 | 12/2011 |
| JP | 62104579 A | 5/1987 |
| JP | 63044883 A | 11/1988 |
| JP | H0214019 A | 1/1990 |
| JP | H0625306 A | 2/1994 |
| JP | 2004507586 A | 3/2004 |
| JP | 2007262595 A | 10/2007 |
| JP | 3975267 B2 | 12/2007 |
| JP | 2008208480 A | 9/2008 |
| JP | 2008295885 A | 12/2008 |
| JP | 2010138276 A | 6/2010 |
| KR | 20070118730 A | 12/2007 |
| KR | 20080062092 A | 7/2008 |
| NL | 9700003 A | 7/1997 |
| WO | 9311803 A1 | 6/1993 |
| WO | 9627615 A1 | 9/1996 |
| WO | 9808876 A1 | 3/1998 |
| WO | 9901143 A1 | 1/1999 |
| WO | 9957158 A1 | 11/1999 |
| WO | 0063470 A1 | 10/2000 |
| WO | 0134657 A1 | 5/2001 |
| WO | 0218448 A2 | 3/2002 |
| WO | 0218450 A1 | 3/2002 |
| WO | 0232913 A1 | 4/2002 |
| WO | 0248197 A1 | 6/2002 |
| WO | WO 02057210 A1 * | 7/2002 |
| WO | 2005028632 A2 | 3/2005 |
| WO | 2006010066 A2 | 1/2006 |
| WO | 2006026104 A2 | 3/2006 |
| WO | 2006056204 A1 | 6/2006 |
| WO | 2007003905 A1 | 1/2007 |
| WO | 2007006403 A2 | 1/2007 |
| WO | 2007009728 A2 | 1/2007 |
| WO | 2007033677 A1 | 3/2007 |
| WO | 2008031525 A1 | 3/2008 |
| WO | 2008077172 A2 | 7/2008 |
| WO | 2009037566 A2 | 3/2009 |
| WO | 2009050389 A2 | 4/2009 |
| WO | 2009108100 A1 | 9/2009 |
| WO | 2009148405 A1 | 12/2009 |
| WO | 2010018324 A1 | 2/2010 |
| WO | 2010051783 A1 | 5/2010 |
| WO | 2010061005 A1 | 6/2010 |
| WO | 2010095049 A1 | 8/2010 |
| WO | 2010095052 A2 | 8/2010 |
| WO | 2010095056 A2 | 8/2010 |
| WO | 2010130810 A1 | 11/2010 |
| WO | 2010138074 A1 | 12/2010 |
| WO | 2011014432 A1 | 2/2011 |
| WO | 2011028031 A2 | 3/2011 |
| WO | 2011059325 A2 | 5/2011 |
| WO | 2011059326 A2 | 5/2011 |
| WO | 2011069474 A2 | 6/2011 |
| WO | 2011069475 A2 | 6/2011 |
| WO | 2012089179 A1 | 7/2012 |
| WO | 2012146218 A1 | 11/2012 |
| WO | 2013056312 A1 | 4/2013 |
| WO | 2014023272 A1 | 2/2014 |

OTHER PUBLICATIONS

Jahn, Michael, et al., "The Reaction of Hyaluronic Acid and its Monomers Glucuronic Acid and N-Acetylglucosamine, with Reactive Oxygen Species," Carbohydrate Research, vol. 321, pp. 228-234 (1999).

Weng, Lihui, et al., "Self-Crosslinkable Hydrogels Composed of Partially Oxidized Hyaluronan and Gelatin: In Vitro and in Vivo Responses," Journal of Biomedical Materials Research Part A, pp. 352-365 (Aug. 9, 2007).

Sahiner, Nurettin, et al., "Fabrication and Characterization of Cross-Linkable Hydrogel Particles Based on Hyaluronic Acid: Potential Application in Vocal Fold Regeneration," Journal of Biomaterials Science, Polymer Edition, vol. 19, Issue 2, pp. 223-243 (2008).

Weng, Lihui, et al., "In Vitro and in Vivo Suppression of Cellular Activity by Guanidinoethyl Disulfied Released from Hydrogel Microspheres Composed of Partially Oxidized Hyaluronan and Gelatin," Biomaterials, vol. 29, pp. 4149-4156 (Aug. 3, 2008).

Scott, J.E., et al., "Periodate Oxidation of Acid Polysaccharides," Histochemie, vol. 19, pp. 155-161 (Apr. 26, 1969).

Chem Files, vol. 5, No. 1, pp. 1-11, (May 2005).

Readily Accessible 12-I-51 Oxidant for the Conversion of Primary and Secondary Alcohols to Aldehydes and Ketones, J. Org. Chem., vol. 48, pp. 4155-4156 (1983).

Japanese Patent Office, Japanese Official Action issued in corresponding Japanese Patent Application No. 2012-542355, mailed Oct. 17, 2014.

European Patent Office, International Search Report and Written Opinion issued in International Patent Application No. PCT/CZ2010/000128, mailed Jun. 9, 2011.

European Patent Office, International Preliminary Report on Patentability issued in corresponding International Patent Application No. PCT/CZ2010/000128 issued on Feb. 5, 2013.

Linhardt, R.J. et al., "Polysaccharide lyases," Applied Biochemistry and Biotechnology (1986) 12:135-176.

Linhartova, B., Nanovlakna na bazi hyaluronanu, Bakalarska prace, Vysoke uceni technicke v Brne, 2008.

Liu, Yanchun et al., "Biocompatibility and stability of disulfide-crosslinked hyaluronan films," Biomaterials vol. 26, No. 23, 2005, pp. 4737-4746.

Liu, Yanhua et al., Dual targeting folate-conjugated hyaluronic acid polymeric micelles for paclitaxel delivery, International Journal of Pharmaceutics, vol. 421, No. 1, 2011, pp. 160-169.

(56) References Cited

OTHER PUBLICATIONS

Luo, Y. et al., "Novel amphoteric pH-sensitive hydrogels derived from ethylenediaminetetraacetic dianhydride, butanediamine and amino-terminated poly(ethylene glycol): Design, synthesis and swelling behavior," European Polymer Journal (2011) 47:40-47.

Malkoch, M. et al., "Synthesis of well-defined hydrogel networks using Click chemistry," Chem. Commun. (2006) 2774-2776.

Matsushima, R. et al., "Photoreactions of Alkylated 2-Pyridones," J. Chem. Soc. Perkin Trans. 2 (1985) 1445-1448.

Mayol, L. et al., Amphiphilic hyaluronic acid derivatives toward the design of micelles for the sustained delivery of hydrophobic drugs, Carbohydrate Polymers, vol. 102, Feb. 1, 2014, pp. 110-116.

Mazzone, S. B., Mori, N., Bunnan, M., Palovich, M., Belmonte, K. E.. & Canning, B. J. (2006). Fluorescent styryl dyes FM 1-43 and FM2-10 are muscarinic receptor antagonists: intravital visualization of receptor occupancy. The Journal of Physiology, 575(1), 23-35.

McIntyre, J.E, "The Chemistry of Fibres," Studies in Chemistry No. 6, 1971, p. 15.

McTaggart, L.E. et al., "Assessment of polysaccharide gels as drug delivery vehicles," Int. J. Pharm. 1993, vol. 100, pp. 199-206.

Miller, R.J. et al., Chemistry and Biology of Hyaluronan: Medicinal Uses of Modified Hyaluronate. Elsevier Ltd. 2004. 505-528.

Nevell, T.P. et al., "Cellulose Chemistry and its Applications," 1985, John Wiley & Sons, pp. 455-479.

Office Action in U.S. Appl. No. 13/512,484, mailed Oct. 1, 2015, 8 pgs.

Office Action in U.S. Appl. No. 13/512,484, mailed Sep. 11, 2014, 8 pgs.

Office Action in U.S. Appl. No. 13/977,181, mailed Jan. 22, 2016, 8 pgs.

Office Action in U.S. Appl. No. 14/113,527, mailed Feb. 12, 2016, 11 pgs.

Oh, E.J. et al., "Target specific and long-acting delivery of protein, peptide, and nukleotide therapeutics using hyaluronic acid derivatives," J. Controlled Release vol. 141, 2010, pp. 2-12.

Pal, K. et al., "Biopolymers in Controlled-Release Delivery Systems," Modem Biopolymer Science (2009) 519-557.

Park, Y.D. et al., Photopolymerized hyaluronic acid-based hydrogels and interpenetrating networks, Biomaterials: (2003) 24:893-900.

Patel, P. K.; Monda!, M. S.; Modi, S.; Behere, D. V., Kinetic studies on the oxidation of phenols by the horseradish peroxidase compound II. Biochim Biophys Acta 1997, 1339 (1), 79-87.

Piluso, S. et al., "Hyaluronic acid-based hydrogels crosslinked by copper-catalyzed azide-alkyne cycloaddition with tailorable mechanical properties," International Journal of Artificial Organs (2011) 34:192-197, Abstract.

Prestwich, G.D., "Hyaluronic acid-based clinical biomaterials derived for cell and molecule delivery in regenerative medicine," Journal of Controlled Release (2011) 155:193-199.

Qiu, Y. et al., "Environment-sensitive hydrogels for drug delivery," Advanced Drug Delivery Reviews (2001) 53:321-339.

Rao, K.V.R. et al., "Influence of Molecular Size and Water Solubility of the Solute on its Release from Swelling and Erosion Controlled Polymeric Matrices," Journal of Controlled Release (1990) 12:133-141.

Remy, H., Anorganicka chemie II., Sntl Praha 1971, pp. 306-321.

Ritger, P.L. et al., "A Simple Equation for Description fo Solute Release I. Fickian and Non-Fickian Release from Non-Swellable Devices in the Form of Slabs, Spheres, Cylinders or Discs," Journal of Controlled Release (1987) 5:23-36.

Ritger, P.L. et al., "A Simple Equation for Description fo Solute Release II. Fickian and Anomalous Release from Swellable Devices," Journal of Controlled Release (1987) 5:37-42.

Rostovtsev, V.V. et al., "A Stepwise Huisgen Cycloaddition Process: Copper(I)-Catalyzed Regioselective 'Ligation' of Azides and Terminal Alkynes," Angew. Chem. Int. Ed. (2002) 41(14):2596-2599.

Rupprecht, A., "Wet Spinning of Hyaluronic Acid. Preparation of Oriented Samples," Acta. Chem. Scand. vol. B33, No. 10, 1979, pp. 779-780.

Schante C.E. et al., "Chemical modifications of hyaluronic acid for the synthesis of derivatives for a broad range of biomedical applications," Carbohydrate Polymers (2011) 85:469-489.

Scott, J.E. et al., "Secondary and tertiary structures of hyaluronan in aqueous solution, investigated by rotary shadowing—electron microscopy and computer simulation," J. Biochem vol. 274, 1991, pp. 699-705.

Sedova, P. et al., "Preparation of hyaluronan polyaldehyde—a precursor of biopolymer conjugates," Carbohydrate Research (2013) 371:8-15.

Seidlits, S.K. et al., "The effects of hyaluronic acid hydrogels with tunable mechanical properties on neural progenitor cell differentiation" Biomaterials (2010) 31:3930-3940.

Shang, J. et al., "Chitosan-based electroactive hydrogel," Polymer (2008) 49:5520-5525.

Sheehan, J.K. et al., X-ray diffraction studies on the connective tissue polysaccharides; J. Mol. Biol. 1975; 91; 153-163.

Shen, Y. et al., Synthesis and characterization of low molecular weight hyaluronic acid-based cationic micelles for efficient siRNA delivery, Carbohydrate Polymers, vol. 77, No. 1, 2009, pp. 95-104.

Shimizu, M. et al., "Studies on hyaluronidase, chondroitin sulphatase, proteinase and phospholipase secreted by Candida species," MYCOSES (1996) 39:161-167.

Shutava, T.; Zheng, Z.; John, V.; Lvov, Y., Microcapsule modification with peroxidase-catalyzed phenol polymerization. Biomacromolecules 2004, 5 (3), 914-21.

Sieburth, S.M. et al., "Fusicoccin Ring System by [4+4] Cycloaddition. 2. A Model Study," Tetrahedron Letters (1999) 40:4007-4010.

Sieburth, S.M. et al., "The [4+4] Cycloaddition and its Strategic Application in Natural Product Synthesis," Tetrahedron (1996) 52(18):6251-6282.

Slaughter, B. V.; Khurshid, S. S.; Fisher, 0. Z.; Khademhosseini, A.; Peppas, N. A., Hydrogels in Regenerative Medicine. Advanced Materials 2009, 21 (32-33), 3307-3329.

Slezingrova, K. et al., "Synteza a charakterizace palmitoyl hyaluronanu," Chemicke Listy (2012) 106:554-567.

Smeds, K.A. et al., "Photocrosslinkable polysaccharides for in situ hydrogel formation," J. Biomed. Mater. Res. (2001) 54:115-121.

Smejkalova, D., Hennannova, M. Sulakova. R. Prf!Sova. A., Kucerik, J., & Velebny, V., Structural and conformational differences of acylated hyaluronan modified in protic and aprotic solvent system. Carbohydrate Polymers (2012) 87(2):1460-1466.

Staskus, P.W. et al., "Double-Stranded Structure for Hyaluronic Acid in Ethanol-Aqueous Solution As Revealed by Circular Dichroism of Oligomers," Biochemistry vol. 27, No. 5, 1988, pp. 1528-1534.

Svanovsky, E. et al., "The effect of molecular weight on the biodistribution of hyaluronic acid radiolabeled with 111-In after intravenous administration to rats," Eur. J. Drug Metab. Ph. 2008, vol. 33, No. 3, pp. 149-157.

Tan, H.; Chu, C. R.; Payne, K. A.; Marra, K. G., Injectable in situ forming biodegradable chitosan-hyaluronic acid based hydrogels for cartilage tissue engineering. Biomaterials 2009, 30 (13), 2499-2506.

Tankam, P.F. et al., "Alkynyl polysaccharides: synthesis of propargyl potato starch followed by subsequent derivatizations," Carbohydrate Research (2007) 342:2049-2060.

Tao, Y., Xu. J., Chen, M.. Bai, H., & Liu, X. Core cross-linked hyaluronan-styrylpyridinium micelles as a novel carrier for paclitaxel. (2012). Carbohydrate Polymers, 88(1), 118-124.

Hasegawa, T. et al., "'Click chemistry' on polysaccharides: a convenient, general, and monitorable approach to develop (1-3)-β-D-glucans with various functional appendages," Carbohydrate Research (2006) 341:35-40.

Hewson, W. D.; Dunford, H. B., Oxidation of p-cresol by horseradish peroxidase compound I. J Biol Chem 1976, 251 (19), 6036-42.

Hewson, W. D.; Dunford, H. B., Stoichiometry of the reaction between horseradish peroxidase and p-cresol. J Biol Chem 1976, 251(19), 6043-52.

Higashimura, H.; Kobayashi, S., Oxidative Polymerization. John Wiley & Sons, Inc. Olefin Fibers (2002) 10:740-764.

Hocek, M., "Tvorba C-C A C-X Vazeb Cross-Coupling Reakcemi Katalyzovanymi Komplexy Prechodnych Kovu," Chem. Listy (2003) 97:1145-1150.

(56) References Cited

OTHER PUBLICATIONS

Hofmann, H. et al., "Conformational Changes of Hyaluronic Acid in Acid Medium," Albrecht Von Graefe's Archive for Clinical and Experimental Opthamology vol. 198, No. 1, 1976, pp. 95-100.
Holten, K.B. et al., "Appropriate Prescribing of Oral Beta-Lactam Antibiotics," American Family Physician (2000) 62 (3):611-620.
Huerta-Angeles, G. et al., "Synthesis of highly substituted amide hyaluronan derivatives with tailored degree of substitution and their crosslinking via click chemistry," Carbohydrate Polymers (2011) 84:1293-1300.
Huh, K.M. et al., "Hydrotropic polymer micelle system for delivery of paclitaxel," Journal of Controlled Release (2005) 101:59-68.
Hynes, W.L. et al., "Hyaluronidases of Gram-positive bacteria," FEMS Microbiology Letters (2000) 183:201-207.
Inanaga, J. et al., A Rapid Esterification by Means of Mixed Anhydride and Its Application to Large-ring Lactonization, Bulletin of the Chemical Society of Japan, vol. 52, No. 7, 1979, pp. 1989-1993.
International Preliminary Report on Patentability in International Patent Application No. PCT/CZ2010/000129, mailed Jun. 12, 2012, 5 pgs.
International Search Report and Written Opinion in International Patent Application No. PCT/CZ2013/000057, mailed Jul. 24, 2013, 7 pgs.
International Search Report and Written Opinion in International Patent Application No. PCT/CZ2013/000063, mailed Apr. 23, 2015, 16 pgs.
International Search Report and Written Opinion in International Patent Application No. PCT/CZ2013/000091, mailed Oct. 31, 2013, 6 pgs.
International Search Report and Written Opinion in International Patent Application No. PCT/CZ2013/000116, dated Jan. 28, 2014, 8 pgs.
International Search Report in International Patent Application No. PCT/CZ2009/000131, mailed Apr. 9, 2010, 3 pgs.
International Search Report in International Patent Application No. PCT/CZ2010/000030, mailed Sep. 1, 2010, 3 pgs.
International Search Report in International Patent Application No. PCT/CZ2010/000129, mailed Jun. 15, 2011, 3 pgs.
International Search Report in International Patent Application No. PCT/CZ2011/000126, mailed Apr. 12, 2012, 3 pages.
International Search Report in International Patent Application No. PCT/CZ2012/0000035, mailed Aug. 28, 2012, 3 pgs.
International Search Report in International Patent Application No. PCT/CZ2013/000023, mailed Aug. 9, 2013, 3 pgs.
International Search Report in International Patent Application No. PCT/CZ2013/000155, mailed Feb. 19, 2014, 4 pgs.
International Search Report in International Patent Application No. PCT/CZ2013/000156, mailed Apr. 4, 2014, 5 pgs.
International Search Report in International Patent Application No. PCT/CZ2013/000157, mailed Mar. 19, 2014, 3 pgs.
International Search Report in International Patent Application No. PCT/CZ2013/000158, mailed Mar. 19, 2014, 3 pgs.
Jacoboni, I., "Hyaluronic Acid by Atomic Force Microscopy," Journal of Structural Biology vol. 126, 1999, pp. 52-58.
Japanese Official Action (English language translation) in Japanese Patent Application No. 2014-506754, dated Jan. 22, 2015, 2 pgs.
Japanese Official Action (including English language translation) in Japanese Patent Application No. 2012-542356, mailed Oct. 3, 2014, 8 pgs.
Jia, X.Q. et al., "Synthesis and Characterization of in Situ Cross-Linkable Hyaluronic Acid-Based Hydrogels with Potential Application for Vocal Fold Regeneration," Macromolecules (2004) 37:3239-3248.
Jin, R.; Hiemstra, C.; Zhong, Z.; Feijen, J., Enzyme-mediated fast in situ formation of hydrogels from dextran-tyramine conjugates. Biomaterials 2007, 28 (18), 2791-2800.
Job, D.; Dunford, H. B., Substituent effect on the oxidation of phenols and aromatic amines by horseradish peroxidase compound I. Eur J Biochem 1976, 66 (3), 607-14.
Jou, Chi-Hsiung et al. Journal of Applied Polymer Science vol. 104, No. 1, 2007, pp. 220-225.
Juhlin, L., Hyaluronan in skin; Journal of Internal Medicine; 1997; 242; 61-66.
Kalyanaraman, B.; Felix, C. C.; Sealy, R. C., Peroxidatic oxidation of catecholamines. A kinetic electron spin resonance investigation using the spin stabilization approach. Journal of Biological Chemistry 1984, 259 (12), 7584-7589.
Katritzky, A.R. et al., "Cycloaddition Reactions of Heteroaromatic Six-Membered Rings," Chem. Rev. (1989) 89:827-861.
Kawaguchi, Y. et al., "The relation between the adsorption behavior at the interface and the conformational changes in hyaluronates partially modified with various acyl chains," Carbohydrate Polymers (1995) 26:149-154.
Kedar, U. et al., Advances in polymeric micelles for drug delivery and tumor targeting, Nanomedicine Vanotechnology, Biology and Medicine, vol. 6, No. 6, 2010, pp. 714-729.
Kim, B. et al., "Complexation Phenomena in pH-Responsive Copolymer Networks with Pendent Saccarides," Macromol. (2002) 35:9545-9550.
Kim, T. G., Lee, H., Jang, Y., & Park, T. G. (2009). Controlled Release of Paclitaxel from Heparinized Metal Stent Fabricated by Layer-by-Layer Assembly of Polylysine and Hyaluronic Acid-g-Poly(lactic-co-glycolic acid) Micelles Encapsulating Paclitaxel. Biomacromolecules, 10(6), 1532-1539.
Korsmeyer, R.W. et al., "Mechanisms of solute release from porous hydrophilic polymers," International Journal of Pharmaceutics (1983) 15:25-35.
Kuo, J.W., "Practical Aspects of Hyaluronan Based Medical Products," 2006, CRC Press, Taylor & Francis Group, pp. 60-61.
Lapcik, L. Jr. et al., Chemicke Listy vol. 85, 1991, pp. 281-298.
Leach, J.B. et al., "Characterization of protein release from photocrosslinkable hyaluronic acid-polyethylene glycolhydrogel tissue engineering scaffolds," Biomaterials (2005) 26:125-135.
Leach, J.B. et al., "Photocrosslinked Hyaluronic Acid Hydrogels: Natural, Biodegradable Tissue Engineering Scaffolds," Biotechnol Bioeng. (2003) 82:578-589.
Lee, F.; Chung, J. E.; Kurisawa, M., An injectable enzymatically crosslinked hyaluronic acid-tyramine hydrogel system with independent tuning of mechanical strength and gelation rate. Soft Matter 2008, 4, 880-887.
Lee, K.Y. et al., "Electrospinning of polysaccharides for regenerative medicine," Advanced Drug Delivery Reviews (2009) 61:1020-1032.
Lee, S.A. et al., Spectroscopic studies of the physical properties of hyaluronate films: the origin of the phase transition; Carbohydrate Polymers; 1995; 28; 61-67.
Li, J. et al., Redox-sensitive micelles self-assembled from amphiphilic hyaluronic acid-deoxycholic acid conjugates for targeted intracellular delivery of paclitaxel. Biomaterials (2012) 33(7), 2310-2320.
Testa, G. et al., "Influence of dialkyne structure on the properties of new click-gels based on hyaluronic acid," International Journal of Pharmaceutics (2009) 378:86-92.
Til, H.P., Falke, H. E., Prinsen, M. K., & Willems, M. I. (1997). Acute and Subacute Toxicity of Tyramine, Spermidine, Spermine, Putrescine and Cadaverine in Rats. Food and Chemical Toxicology, 35(3-4), 337-348.
Tonelli, A. E., Effects of crosslink density and length on the number of intramolecular crosslinks (defects) introduced into a rubbery network. Polymer 1974, 15 (4), 194-196.
Tornoe, C. et al., "Peptidotriazoles on Solid Phase: [1,2,3]-Triazoles by Regiospecific Copper(I)-Catalyzed 1,3-Dipolar Cycloadditions of Terminal Alkynes to Azides," J. Org. Chem. (2002) 67:3057-3064.
Um, I.C. et al., "Electro-Spinning and Electro-Blowing of Hyaluronic Acid," Biomacromolecules (2004) 5:1428-1436.
Uyama, H.; Kobayashi, S., Enzymatic Synthesis of Polyphenols. Current Organic Chemistry 2003, 7, 1387-1397.
van Bommel, K.J.C. et al., "Responsive Cyclohexane-Based Low-Molecular-Weight Hydrogelators with Modular Architecture," Angew. Chem. Int. Ed. (2004) 1663-1667.
Veitch, N.C., Horseradish peroxidase: a modem view of a classic enzyme. Phytochemistry 2004, 65 (3), 249-259.

(56) References Cited

OTHER PUBLICATIONS

Wang, J., Mongayt, D., & Torchilin, V. P. (2005). Polymeric Micelles for Delivery of Poorly Soluble Drugs: Preparation and Anticancer Activity In Vitro of Paclitaxel Incorporated into Mixed Micelles Based on Polyethylene Glycol)-Lipid Conjugate and Positively Charged Lipids. Journal of Drug Targeting, 13(1), 73-80.

Wang, X. et al., "Formation of water-resistant hyaluronic acid nanofibers by blowing-assisted electro-spinning an dnon-toxic post treatments," Polymer vol. 46, No. 13, 2005, pp. 4853-4867.

Won, K. et al., Horseradish Peroxidase-Catalyzed Polymerization of Cardanol in the Presence of Redox Mediators. Biomacromolecules 2003, 5(1), 1-4.

Written Opinion in International Patent Application No. PCT/CZ2009/000131, mailed Apr. 9, 2010, 3 pgs.

Written Opinion in International Patent Application No. PCT/CZ2010/000030, mailed Sep. 1, 2010, 4 pgs.

Written Opinion in International Patent Application No. PCT/CZ2011/000126, mailed Apr. 12, 2012, 4 pgs.

Written Opinion in International Patent Application No. PCT/CZ2012/000035, mailed Aug. 28, 2012, 4 pgs.

Written Opinion in International Patent Application No. PCT/CZ2013/000023, mailed Aug. 9, 2013, 3 pgs.

Written Opinion in International Patent Application No. PCT/CZ2013/000155, mailed Feb. 19, 2014, 6 pgs.

Written Opinion in International Patent Application No. PCT/CZ2013/000156, mailed Apr. 4, 2014, 7 pgs.

Written Opinion in International Patent Application no. PCT/CZ2013/000157, mailed Mar. 19, 2014, 6 pgs.

Written Opinion in International Patent Application No. PCT/CZ2013/000158, mailed Mar. 19, 2014, 7 pgs.

Xu, Y.-P.; Huang, G.-L.; Yu, Y.-T., Kinetics of phenolic polymerization catalyzed by peroxidase in organic media. Biotechnology and Bioengineering 1995, 47 (1), 117-119.

Yamane, Shintaro et al., "Feasibility of chitosan-based hyaluronic acid hybrid biomaterial for a novel scaffold in cartilage tissue engineering," Biomaterials vol. 26, No. 6, 2005, pp. 611-619.

Yao, F. et al., "A Novel Amphoteric, pH-Sensitive, Biodegradable Poly[chitosan-g-(L-lactic-co-citric) acid] Hydrogel," Journal of Applied Polymer Science (2003) 89:3850-3854.

Yeom, J. et al., "Effect of Cross-Linking Reagents for Hyaluronic Acid Hydrogel Dermal Fillers on Tissue Augmentation and Regeneration," Bioconjugate Chemistry (2010) 21(2):240-247.

Zhong, S.P. et al., "Biodegradation of hyaluronic acid derivatives by hyalurondiase," Biomaterials vol. 15, No. 5, 1994, pp. 359-365.

Akkara, J. A.; Senecal, K. J.; Kaplan, D. L., Synthesis and characterization of polymers produced by horseradish peroxidase in dioxane. Journal of Polymer Science Part A: Polymer Chemistry 1991, 29 (11), 1561-1574.

Armstrong, D.C. et al., "Culture Conditions Affect the Molecular Weight Properties of Hyaluronic Acid Produced by Streptococcus zooepidemicus," Appl. Environ. Microbiol. (1997) 63(7):2759-2764.

Atkins, E.D.T. et al., "The Conformation of the Mucopolysaccharides," J. Biochem vol. 128, 1972, pp. 1255-1263.

Atkins, E.D.T. et al., "The Molecular Structure of Hyaluronic Acid," Biochemical Journal vol. 125, No. 4, 1971, p. 92.

Author unknown, Encyclopedia of Cellulose, Asakura Publishing Co., Ltd., pp. 155-156 (Nov. 10, 2000).

Bakke, M. et al., "Identification, characterization, and molecular cloning of a novel hyaluronidase, a member of glycosyl hydrolase family 16, from Penicillium spp.," FEBS Letters (2011) 585(1):115-120.

Banerji, S. et al., "Structures of the Cd44-hyaluronan complex provide insight into a fundamental carbohydrate-protein interaction," Nature Structural & Molecular Biology vol. 14, No. 3, 2007, pp. 234-239.

Benedetti, L., et al., Biocompatibility and biodegradation of different hyaluronan derivatives (Hyaff) implanted-in rats. Biomaterials 1993, 14 (15), 1154-1160.

Bezakova, Z. et al., "Effect of microwave irradiation on the molecular and structural properties of hyaluronan," Carbohydrate Polymers, vol. 73, No. 4, 2008, pp. 640-646.

Boyer, I.J., Toxicity of dibutyltin, tributyltin and other organotin compounds to humans and to experimental animals. Toxicology (1989) 55(3), 253-298.

Burdick, J.A. et al., "Controlled Degradation and Mechanical Behavior of Photopolymerized Hyaluronic Acid Networks,". Biomacromolecules (2005) 6:386-391.

Burdick, J.A. et al., "Hyaluronic Acid Hydrogels for Biomedical Applications," Adv. Mater. (2011) 23:H41-H56.

Burke, J., Solubility Parameters: Theory and Application, The Book and Paper Group Annual, vol. Three, 1984, 62 pgs.

Burner, U.; Obinger, C., Transient-state and steady-state kinetics of the oxidation of aliphatic and aromatic thiols by horseradish peroxidase. FEES Letters 1997, 411 (2-3), 269-274.

Chem Files Synthetic Methods Oxidation, May 2005, vol. 5, No. 1 pp. 1-11.

Chen, L. et al., "Synthesis and pH sensitivity of carboxyymethyl chitosan-based polyampholyte hydrogel for protein carrier matrices," Biomaterials (2004) 25:3725-3732.

Chi-Hsiung, J. et al., Biocompatibility and Antibacterial Activity of Chitosan and Hyaluronic Acid Immobilized Polyester Fibers, Journal of Applied Polymer Science vol. 104, No. 1, 2007, pp. 220-225.

Crescenzi, V. et al., "Novel Hydrogels via Click Chemistry: Synthesis and Potential Biomedical Applications," Biomacromolecules (2007) 8:1844-1850.

Czech Official Action in Czech Patent Application No. PV 2008-705, dated Oct. 23, 2009, 2 pgs.

Czech Official Action in Czech Patent Application No. PV 2009-835, mailed Aug. 2010.

Czech Search Report in Czech Patent Application No. PV 2010-1001, dated Sep. 27, 2011, 1 pg.

Czech Search Report in Czech Patent Application No. PV 2011-241, dated Nov. 30, 2011, 1 pg.

Czech Search Report in Czech Patent Application No. PV 2012-136, dated Sep. 18, 2012, 3 pgs.

El-Sherbiny, I.M. et al., "Poly(ethylene glycol)-carboxymethyl chitosan-based pH-responsive hydrogels: photo-induced synthesis, characterization, swelling, and in vitro evaluation as potential drug carriers," Carbohydrate Research (2010) 345:2004-2012.

Elander, R.P., "Industrial production of β-lactam antibiotics," Applied Microbiology and Biotechnology (2003) 61:385-392.

European First Official Action in European Patent Application No. 10812840.6-1306, mailed Jul. 2, 2013, 4 pgs.

European Second Official Action in European Patent Application No. 10812840.6-1306, mailed Sep. 24, 2014, 5 pgs.

Feng, Qian et al., "Self-Assembly Behaviour of Hyaluronic Acid on Mica by Atomic Force Microscopy," vol. 20, No. 1, 2004, pp. 146-148 and 152 (English language Abstract p. 152).

Ferrero, C. et al., "Fronts movement as a useful tool for hydrophilic matrix release mechanism elucidation," International Journal of Pharmaceutics (2000) 202:21-28.

Ferruti, P. et al., "Novel Poly(amido-amine)-Based Hydrogels as Scaffolds for Tissue Engineering," Macromol. Biosci. (2005) 5:613-622.

Funakoshi, T. et al., "Novel chitosan-based hyaluronan hybrid polymer fibers as a scaffold in ligament tissue engineering," Journal of Biomedical Materials Reasearch, Part A, vol. 74A, No. 3, 2005, pp. 338-346.

Ghan, R.; Shutava, T.; Patel, A.; John, V. T.; Lvov, Y., Enzyme-Catalyzed Polymerization of Phenols within Polyelectrolyte Microcapsules. Macromolecules 2004, 3 7 (12), 4519-4524.

Gibby, W.A., M.D., "Cross-Linked DTPA Polysaccharides for Magnetic Resonance Imaging, Synthesis and Relaxation Properties," Invest. Radiol. 1989, vol. 24, pp. 302-309.

Gilabert, M. A.; Hiner, A. N.; Garcia-Ruiz, P. A.; Tudela, J.; Garcia-Molina, F.; Acosta, M.; Garcia-Canovas, F.; Rodriguez-Lopez, J. N., Differential substrate behaviour of phenol and aniline derivatives during oxidation by horseradish peroxidase: kinetic evidence for a two-step mechanism. Biochim Biophys Acta 2004, 1699 (1-2), 235-43.

(56) References Cited

OTHER PUBLICATIONS

Czech Search Report in Czech Patent Application No. PV 2012-282, dated Jan. 30, 2013, 1 pg.

Czech Search Report in Czech Patent Application No. PV 2012-306, dated Feb. 11, 2013, 1 pg.

Czech Search Report in Czech Patent Application No. PV 2012-664, dated May 24, 2013, 3 pgs.

Czech Search Report in Czech Patent Application No. PV 2012-842, dated Aug. 19, 2013, 3 pgs.

Czech Search Report in Czech Patent Application No. PV 2012-843, dated Aug. 20, 2013, 1 pg.

Darr, A.; Calabro, A., Synthesis and characterization of tyramine-based hyaluronan hydrogels. Journal of Materials Science: Materials in Medicine 2009, 20 (1), 33-44.

Dilling, W.L. et al., "Organic Photochemistry. XII. The Photodimerization and Photoisomerization of 2-Pyridone and Its Monochloro Derivatives," Mol. Photochem. (1973) 5(4):371-409.

Donati, A. et al., "Solution Structure of Hyaluronic Acid Oligomers by Experimental and Theoretical NMR, and Molecular Dynamics Simulation," Biopolymers vol. 59, 2001, pp. 434-445.

Dumitriu, S., "Polysaccharides: Structural Diversity and Functional Versatility," 1998, Marcel Dekker Inc., pp. 535-549.

Dunford, H. B.; Cotton, M. L., Kinetics of the oxidation of p-aminobenzoic acid catalyzed by horseradish peroxidase compounds I and II. J Biol Chem 1975, 250 (8), 2920-32.

Eenschooten, C. et al., Preparation and structural characterisation of novel and versatile amphiphilic octenyl succinic anhydride-modified hyaluronic acid derivatives, Carbohydrate Polymers, vol. 79, No. 3, 2010, pp. 597-605.

Gilabert, M. A.; Phenoll, L. G.; Garcia-Molina, F.; Garcia-Ruiz, P. A.; Tudela, J.; Garcia-Canovas, F.; Rodriguez-Lopez, J. N., Stereospecificity of horseradish peroxidase. Biol Chem 2004, 385 (12), 1177-84.

Gilabert, M. A.; Phenoll, L. G.; Garcia-Molina, F.; Tudela, J.; Garcia-Canovas, F.; Rodriguez-Lopez, J. N., Kinetic characterization of phenol and aniline derivates as substrates of peroxidase. Biol Chem 2004, 385 (9), 795-800.

Gong, J. et al., (2012). Polymeric micelles drug delivery system in oncology. Journal of Controlled Release, 159(3), 312-323.

Guillaumie, F. et al., Comparative studies of various hyaluronic acids produced by microbial fermentation for potential topical ophthalmic applications. Journal of Biomedical Materials Research Part A; 2009; 1421-1430.

Gupta, P. et al., "Hydrogels: from controlled release to pH-respoonsive drug delivery," Drug Discovery Today (2002) 7 (10):569-579.

* cited by examiner

OXIDIZED DERIVATIVE OF HYALURONIC ACID, A METHOD OF PREPARATION THEREOF AND A METHOD OF MODIFICATION THEREOF

CROSS-REFERENCE TO RELATED APPLICATIONS

This application is a submission under 35 U.S.C. §371 of International Application No. PCT/CZ2010/000128, filed Dec. 10, 2010, which claims priority to Czech Republic Application No. PV2009-836, filed Dec. 11, 2009, the disclosures of which are hereby expressly incorporated by reference herein in their entireties. This application is related to PCT/CZ2010/000129, filed Dec. 10, 2010.

FIELD OF THE INVENTION

The present invention relates to a method of preparation of a new hyaluronic acid derivative containing an aldehydic group —CH═O instead of the primary hydroxyl group —CH$_2$—OH. The oxidation can be performed by use of DMP (Dess-Martin Periodinane) agent in polar aprotic solvents,

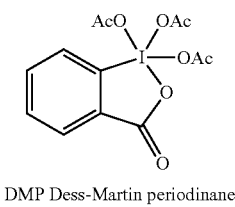

DMP Dess-Martin periodinane where the solvent includes for example dimethylsulfoxide.

BACKGROUND OF THE INVENTION

Hyaluronic acid is an important polysaccharide, composed of two repeating units of β-(1,3)-D-glucuronic acid and β-(1,4)-N-acetyl-D-glucosamine. The molecular weight, depending on the method its isolation and on the source material, is within the range from $5.10^4$ to $5.10^6$ g.mol$^{-1}$. Hyaluronic acid or its sodium salt hyaluronan, is an essential component of connective tissues, synovial fluid of joints, and plays an important role in biological processes such as hydratation, organization of proteoglycans, cells differentiation, proliferation and angiogenesis. Hyaluronic acid is a considerably hydrophilic polysaccharide that is water-soluble in the form of its salt within the whole range of pH.

Scheme 1 Hyaluronic Acid

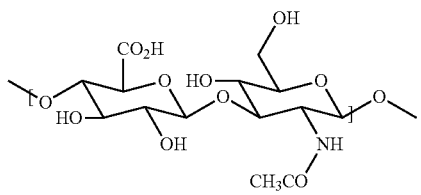

Oxidation of Hyaluronic Acid

Oxidation of polysaccharides is a process in which the oxidation degree of the polysaccharide functional groups is changing. Most frequently, the carboxylic acids or aldehydes are formed, which can dramatically change the properties of the polysaccharide. In most cases, the reaction is performed by use of agents containing atoms in higher oxidation degrees.

The method of selective oxidation of saccharides on the primary hydroxyl group, described in Angelino, European Journal of Organic Chemistry 2006, 19, 4323-4326, the system of 2,2,6,6-tetramethyl-1-piperidinyloxyl radical TEMPO/TCC in DMF at the temperature of 0° C. was used, with the corresponding aldehyde as the main product.

The oxidation of cyclodextrin to monoaldehyde was described by Cornwell, Tetrahedron Letters 1995, 36 (46), 8371-8374. The oxidation was performed by adding Dess-Martin periodinane (DMP) in DMSO or in DMF at the temperature of 20° C. as an oxidizing agent.

2,2,6,6-tetramethyl-1-piperidinyloxyl radical (TEMPO)- and NaOCl-mediated oxidation of the primary hydroxyl group of hyaluronan to a carboxylic acid was performed at pH 10.2 and at the temperature of 0° C. (Scheme 2) (Carbohydr Res 2000, 327 (4), 455-61).

Scheme 2 Oxidation to a carboxylic acid

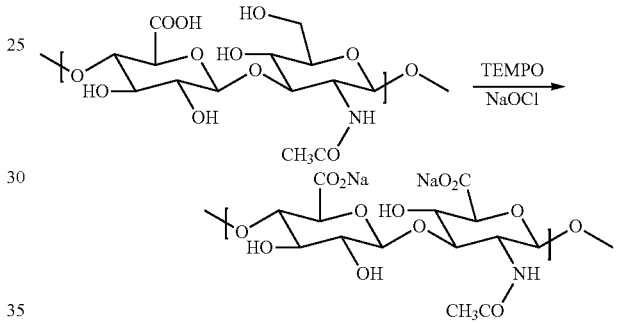

Analogous to other polysaccharides, a high regioselectivity and slight degradation of the polymer were observed. An increase of the concentration of the salt (NaBr, NaCl, Na$_2$SO$_4$) in the solution caused a decrease in the oxidation rate.

Oxidation of hyaluronan by use of TEMPO/NaClO system was described in the patent application WO 02/18448 A2. The authors also dealt with interactions of percarboxylated polysaccharides, while forming biological complexes.

Scheme 3 Oxidation to a dialdehyde

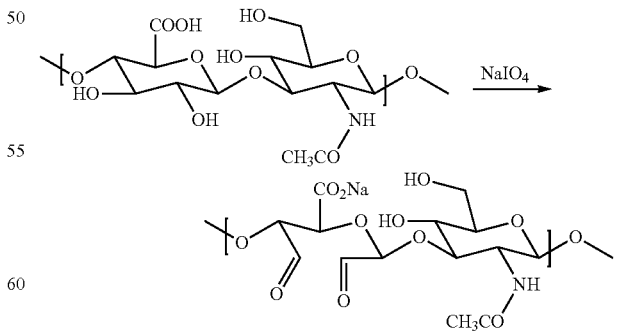

The rate of oxidation of HA and other polysaccharides by use of sodium periodate was studied by Scott et al. (Scheme 3) (Histochemie 1969, 19 (2), 155-61). The factors such as the chain length, substitution, polymer configuration and temperature were studied and quantified. The use of $NaIO_4$ for an oxidation of hyaluronan was also disclosed in the patents Nos. U.S. Pat. Nos. 6,683,064 and 6,953,784.

Model reactions of HA analogues with low molecular weight in a physiological buffer were studied (Carbohydr Res 1999, 321, (3-4), 228-34). Oxidation products of the glucuronic and glucosamine parts were identified by GC-MS analysis. The results also suggest that the oxidation is performed primarily on the glucuronic part, while the meso-tartaric acid is the main product and may be used as a biomarker of the hyaluronan oxidation.

3.4.2 Use of an Oxidized HA in Cross-Linking Reactions

The use of an oxidized HA for the preparation of cross-linked hydrogels was described by Weng et al. (Scheme 4), J Biomed Mater Res A 2008, 85 (2), 352-65. Two precursors were used in this case: a partially oxidized hyaluronan and gelatin:

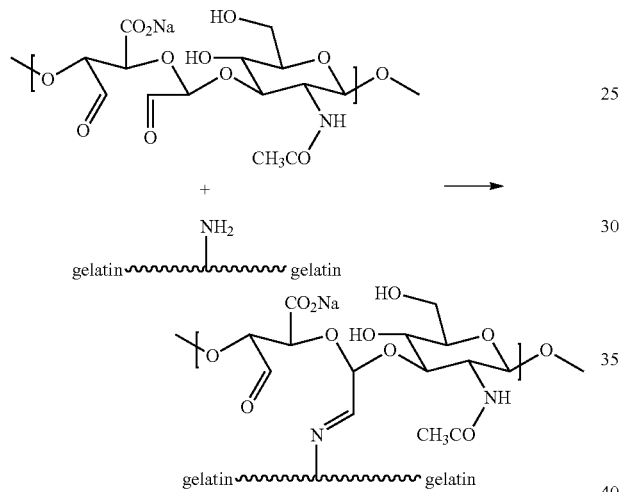

Scheme 4 The cross-linking reaction of the oxidized hyaluronan and gelatin

The physico-chemical properties of the resulting hydrogels have been elucidated by instrumental analyses FT-IR, SEM (scanning electron microscopy) and rheometry. Increasing the oxidation degree of the hyaluronan lead to a corresponding increase of hydrogels compatibility and decrease of water absorption capacity. Dermal fibroblasts were used to study the cell-hydrogel interactions. Both the hydrogels and their degradation products are biocompatible, as proved by the long-term cell viability assay. When cultured with cells, the hydrogel underwent a degradation within 4 weeks, with an obvious loss of cohesiveness. The good biocompatibility and biodegradability was further demonstrated in mice subdermal implantations. Lastly, in vitro and in vivo depositions of extracellular matrix in hydrogels were demonstrated by SEM analysis.

The method of preparation of cross-linked HA from an oxidized hyaluronan and gelatin by a water-in-oil-emulsion method, where a 3-dimensional hydrogel is formed in the absence of any external cross-linker, was described in the publication of Weng et al., Biomaterials 2008, 29, (31), 4149-56. In this work, incorporation of model drugs into the hydrogel structure (encapsulation) and their releasing through macrophages were studied by HPLC.

The preparation of elastic hydrogels by coupling the HA oxidized to HA-aldehyde by means of sodium periodate and the HA modified with adipic acid dihydrazide, was described by Sahiner et al., (Scheme 5), J. Biomater. Sci. Polym. Ed 2008, 19 (2), 223-43.

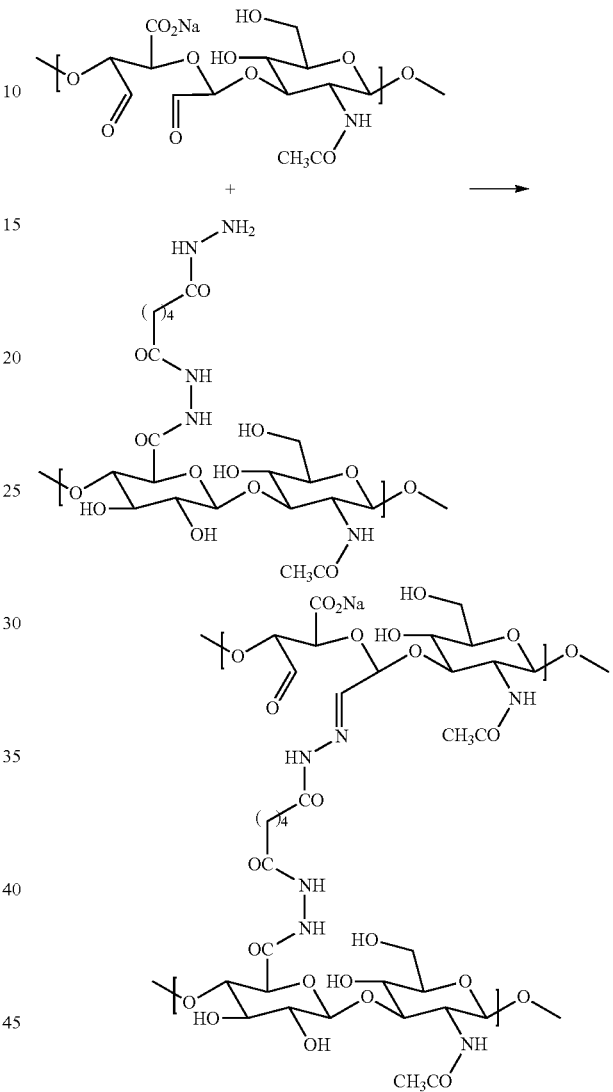

Scheme 5 Preparation of the cross-linked hyaluronan

The resulting derivatives did not have any observable effect on the proliferation of the cultured fibroblasts, as shown by a MTT assay.

SUMMARY OF THE INVENTION

The present invention relates to a method of selective oxidation of the primary hydroxyl group of hyaluronic acid in position 6 of the glucosamine part of the polysaccharide to aldehyde. The reaction is performed in an aprotic environment by use of Dess-Martin periodinane DMP as an oxidizing agent. The presented procedure is original in that it introduces an aldehydic group to the position 6 of the hyaluronan glucosamine part (scheme 6, structure 3). Approaches published up to date have introduced either an aldehydic group to the position 2 and 3 of the hyaluronan glucuronic part, while opening the saccharide ring (scheme 6, structure 2), or a carboxyl group to the position 6 of the hyaluronan glucosamine part (scheme 6, structure 1).

Scheme 6 Hyaluronan oxidation, reaction products

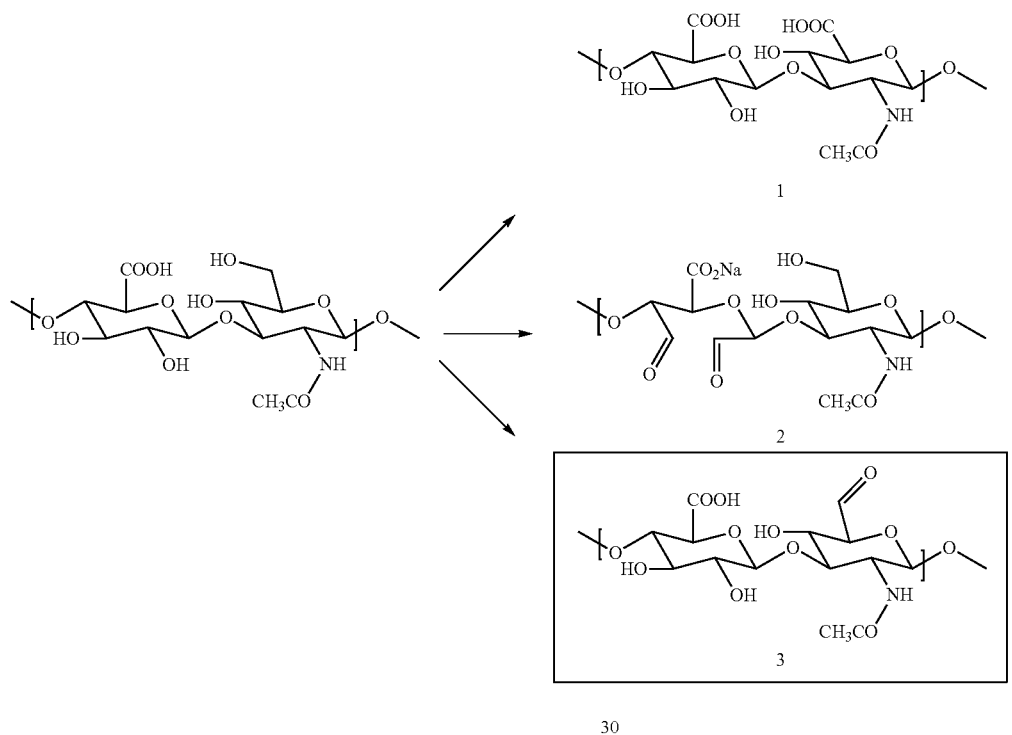

The method according to the invention is more advantageous in that the respective oxidation product (structure 3, scheme 6) maintains the structure of conjugated saccharide rings. Ring opening in the product oxidized to dialdehyde (structure 2, scheme 6) gives rise to the chain linearity "breakage" and, therefore, a significant change of the polysaccharide 3-dimensional structure compared to the non-modified hyaluronan. Although in the product oxidized to a carboxylic acid (structure 1, scheme 6) the chain linearity "breakage" does not occur, the carboxyl group does not enable such various modification (binding) possibilities like the aldehydic group. As the carboxyl group is a component of the non-modified polysaccharide already, the oxidation to the structure 1 (scheme 6) brings only an increase of the polysaccharide polarity, not a development of new quality utilizable for binding new substitutes.

It is known that an aldehydic group with a bound alkyl group exists in water in the so-called geminal diol form HA-CH(OH)$_2$, which reacts with nucleophiles similarly as aldehydes do. In aqueous solutions, more than 95% of the hyaluronan oxidized in the position 6 of the glucosamine part (product 3, scheme 6) exists in the form of a geminal diol; as demonstrated by NMR spectroscopy.

In the method according to the present invention, the hyaluronic acid is dissolved in polar aprotic solvents, e.g. DMSO, then an oxidizing agent is added and the mixture is stirred at the temperature of 10 to 50° C., preferably at 20° C., for at least 5 minutes, preferably for 1 to 150 hours, more preferably for at least 10 hours.

The prepared oxidized hyaluronan can be used for binding of compounds containing for example amino group. The binding can be realized either in an imine form or after the reduction in an amine form (reductive amination) (scheme 7):

Scheme 7 Binding of amines to the oxidized hyaluronan

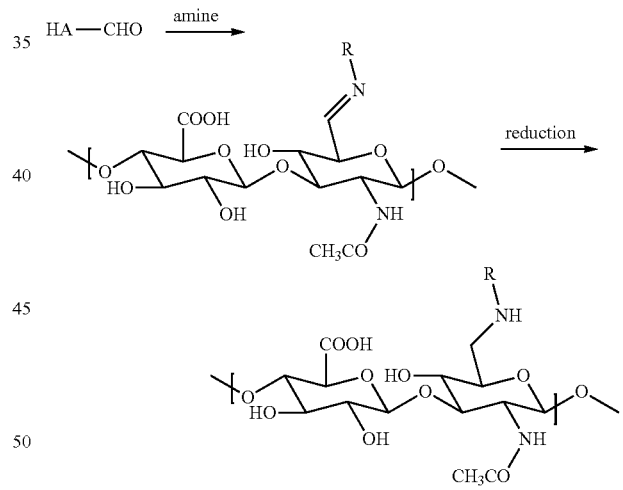

Both degrees of this modification are performed in an aqueous solution, the reduction is performed by means of NaBH$_3$CN. Both degrees of the reaction described in scheme 7 can be performed in one step.

The modification of the hyaluronic acid derivative can be performed by a reaction of the oxidized derivative with an amine of the general formula H$_2$N—R or with a hyaluronan substituted by an —R—NH$_2$ group, wherein R is an alkyl, linear or branched chain C1-C30, optionally containing aromatic or heteroaromatic groups. This amine can be an alkylamine, e.g. butylamine or hexanediamine, amino acid, peptide or polysaccharide containing a free amino group. In case of using a diamine or compounds containing three or more amino groups, cross-linked hyaluronan derivatives can be prepared. The cross-linked derivatives can be prepared also by the reaction of an aldehyde with a hyaluronan substituted by an aminoalkyl group HA-alkyl-NH$_2$.

DETAILED DESCRIPTION OF THE PREFERRED EMBODIMENTS OF THE INVENTION

DS=substitution degree=100% * the molar amount of the bound substitute / the molar amount of all the polysaccharide dimers.

The term "equivalent (eq)" as used herein, refers to a hyaluronic acid dimer, unless otherwise indicated. The percentages as used herein mean a percentage by weight, unless otherwise indicated.

The molecular weight of the starting hyaluronan (source: CPN spol. s r.o., Dolni Dobrouě, CZ) was determined by the SEC-MALLS assay.

EXAMPLE 1

Oxidation of the hyaluronic acid by DMP

DMP solution (0.2 eq) in DMSO (1 ml) was added to a 1% solution of hyaluronic acid (0.1 g, 20 kDa) in DMSO. The mixture was stirred for 24 hours at the temperature of 20° C. The solution was then diluted to 0.1% and dialyzed against the mixture (0.1% NaCl, 0.1% NaHCO$_3$) 3×5 liters (once per day) and against distilled water 7×5 liters (twice per day). The resulting, solution was evaporated and analyzed.

DS 10% (determined by NMR)
$^1$H NMR (D$_2$O) δ 5.26 (s, 1H, polymer-CH(OH)$_2$)
HSQC (D$_2$O) cross signal 5.26 ppm ($^1$H)—90 ppm ($^{13}$C) (polymer-CH(OH)$_2$)
FT-IR (KBr) 1740 cm$^{-1}$ —CH=O

EXAMPLE 2

Oxidation of the Hyaluronic Acid by DMP

DMP solution (0.2 eq) in DMSO (1 ml) was added to a 0.5% solution of hyaluronic acid sodium salt (0.1 g, 600 kDa) in DMSO. The mixture was stirred for 24 hours at the temperature of 20° C. The solution was then diluted to 0.1% and dialyzed against the mixture (0.1% NaCl, 0.1% NaHCO$_3$) 3×5 liters (once per day) and against distilled water 7×5 liters (twice per day). The resulting solution was evaporated and analyzed.

DS 10% (determined by NMR, for details see Example 1)

EXAMPLE 3

Oxidation of the Hyaluronic Acid by DMP

DMP (1 eq) solution in DMSO (1 ml) was added to a 1% solution of hyaluronic acid (0.1 g, 20 kDa) in DMSO. The mixture was stirred for 24 hours at the temperature of 20° C. The solution was then diluted to 0.1% and dialyzed against the mixture (0.1% NaCl, 0.1% NaHCO$_3$) 3×5 liters (once per day) and against distilled water 7×5 liters (twice per day). The resulting solution was evaporated and analyzed.

DS 50% (determined by NMR, for details see Example 1)

EXAMPLE 4

Oxidation of the Hyaluronic Acid by DMP

DMP solution (1 eq) in DMSO (1 ml) was added to a 1% solution of hyaluronic acid (0.1 g, 20 kDa) in DMSO. The mixture was stirred for 1 hour at the temperature of 20° C. The solution was then diluted to 0.1% and dialyzed against mixture (0.1% NaCl, 0.1% NaHCO$_3$) 3 ×5 liters (once per day) and against distilled water 7×5 liters (twice per day). The resulting solution was evaporated and analyzed.

DS 30% (determined by NMR, for details see Example 1)

EXAMPLE 5

Oxidation of the Hyaluronic Acid by DMP

DMP solution (0.2 eq) in DMSO (1 ml) was added to a 1% solution of hyaluronic acid (0.1 g, 20 kDa) in DMSO. The mixture was stirred for 1 hour at the temperature of 50° C. The solution was then diluted to 0.1% and dialyzed against the mixture (0.1 NaCl, 0.1% NaHCO$_3$) 3×5 liters (once per day) and against distilled water 7×5 liters (twice per day). The resulting solution was evaporated and analyzed.

DS 10% (determined by NMR, for details see Example 1)

EXAMPLE 6

Reaction of the Oxidized Hyaluronan with an Amine

An aqueous solution of oxidized hyaluronic acid (1%) (0.1 g, oxidation degree DS=30%, Example 4) was mixed with butylamine (0.4 eq). The mixture was stirred for 24 hours at the temperature of 20° C. The solution was then precipitated by a double amount of acetone and 0.1 ml of a saturated aqueous solution of NaCl, filtrated and dried in vacuum. The resulting yellow material was then analyzed.

UV-VIS 328 nm, n→π*transition—CH=N—

EXAMPLE 7

Reaction of the Oxidized Hyaluronan with Butylamine and the Subsequent Reduction An aqueous solution of oxidized hyaluronic acid (1%) (0.1 g, oxidation degree DS=50%, Example 3) was mixed with butylamine (0.4 eq). The mixture was stirred for 24 hours at the temperature of 20° C. The solution was then mixed with NaBH$_3$CN (3 eq) in 0.5 ml of water. The mixture was stirred for 24 hours at the temperature of 20° C. The solution was then diluted to 0.1% and dialyzed against the mixture (0.1% NaCl, 0.1% NaHCO$_3$) 3×5 liters (once per day) and against distilled water 7×5 liters (twice per day). The resulting solution was evaporated and analyzed.

DS 35% (determined by NMR) $^1$H NMR (D$_2$O) δ 3.05 (m, 2H, polymer-CH$_2$—NH—CH$_2$—), 1.60 (m, 2H, polymer-CH$_2$—NH—CH$_2$—CH$_2$—), 1.35 (m, 2H, polymer-CH$_2$—NH—CH$_2$—CH$_2$—CH$_2$—), 0.85 (m, 3H, —CH$_2$—CH$_3$)

DOSY NMR (D$_2$O) log D (0.85 ppm, —CH$_2$—CH$_3$)~–10.3 m$^2$/s log D (1.35 ppm, polymer-CH$_2$—NH—CH$_2$—CH$_2$—CH$_2$—)~–10.3 m$^2$/s log D (1.60 ppm, polymer-CH$_2$—NH—CH$_2$—CH$_2$—)~–10.3 m$^2$/s log D (3.05 ppm, polymer-CH$_2$—NH—CH$_2$—)~–10.3 m$^2$/s log D (2.03 ppm, CH$_3$—CO—NH-polymer)~–10.3 m$^2$/s log D (H$_2$O)~–8.6 m$^2$/s

EXAMPLE 8

Reaction of the Oxidized Hyaluronan with a Diamine and the Subsequent Reduction

An aqueous solution of the oxidized hyaluronic acid (1%) (0.1 g, oxidation degree DS=50%, Example 3) was mixed with hexanediamine (0.4 eq). The mixture was stirred for 24 hours at the temperature of 20° C. The solution was then mixed with NaBH$_3$CN (3 eq) in 0.5 ml of water. The mixture was stirred for 24 hours at the temperature of 20° C. The solution was then diluted to 0.1% and dialyzed against the mixture (0.1% NaCl, 0.1% NaHCO$_3$) 3×5 liters (once per day) and against distilled water 7×5 liters (twice per day). The resulting solution was evaporated and analyzed.

DS 35% (determined by NMR) $^1$H NMR (D$_2$O) δ 3.12 (m, 2H, polymer-CH$_2$—NH—CH$_2$—), 3.02 (m, 2H, —CH$_2$—NH$_2$), 1.7 (m, 4H, —NH—CH$_2$—CH$_2$—CH$_2$—CH$_2$—CH$_2$—), 1.45 (m, 4H, —NH—CH$_2$—CH$_2$—CH$_2$—CH$_2$—CH$_2$—)

DOSY NMR (D$_2$O) log D (1.45 ppm, —NH—CH$_2$—CH$_2$—CH$_2$—CH$_2$—)~−10.5 m$^2$/s log D (1.7 ppm, —NH—CH$_2$—CH$_2$—CH$_2$—CH$_2$—CH$_2$—)~−10.5 m$^2$/s log D (3.02 ppm, —CH$_2$—NH$_2$)~−10.5 m$^2$/s log D (2.03 ppm, CH$_3$—CO—NH-polymer)~−10.5 m$^2$/s log D (H$_2$O)~−8.7 m$^2$/s

EXAMPLE 9

Reaction of Oxidized Hyaluronan with Amino-Hyaluronan

An aqueous solution of the oxidized hyaluronic acid (1%) (0.1 g, oxidation degree DS=30%, Example 4) was mixed with a 1% aqueous solution of hyaluronan derivative substituted by hexanediamine (1 eq, DS=35%, Example 8) at the temperature of 20° C. The insoluble compact gummy precipitate, obtained after several minutes, was mechanically ground to small pieces that were filtrated and dried under reduced pressure.

FT-IR (KBr) 1700 cm$^{-1}$

EXAMPLE 10

Reductive Amination of the Oxidized Hyaluronan with Lysine

An aqueous solution of the oxidized hyaluronic acid (1%) (0.1 g, oxidation degree DS=30%, Example 4) was mixed with lysine (0.3 eq). The mixture was stirred for 24 hours at the temperature of 20° C. The solution was then mixed with NaBH$_3$CN (3 eq) in 0.5 ml of water. The mixture was stirred for 24 hours at the temperature of 20° C. The solution was diluted to 0.1% and dialyzed against the mixture (0.1% NaCl, 0.1% NaHCO$_3$) 3×5 liters (once per day) and against distilled water 7×5 liters (twice per day). The resulting solution was evaporated and analyzed.

DS 25% (determined by NMR) $^1$H, HSQC, DOSY NMR (2% NaOD/D$_2$O): δ 1.33 (m, 2H, —CH—CH$_2$—CH$_2$—), 1.48 (m, 2H, —CH—CH$_2$—CH$_2$—CH$_2$—), 1.55 (m, 1H, —CH—CHH—), 1.63 (m, 1H, —CH—CHH—), 2.62 (m, 2H, —CH—CH$_2$—CH$_2$—CH$_2$—CH$_2$—), 2.65 (m, 1H, polymer-CHH—NH—), 2.99 (m, 1H, polymer-CHH—NH—), 3.16 (m, 1H, —CH—CH$_2$—).

EXAMPLE 11

Reductive Amination of the Oxidized Hyaluronan with Lysine

An aqueous solution of the oxidized hyaluronic acid (1%) (0.1 g, oxidation degree DS=30%, Example 4) was mixed with lysine (20 eq). The mixture was stirred for 24 hours at the temperature of 20° C. The solution was then mixed with NaBH$_3$CN (10 eq) in 0.5 ml of water. The mixture was stirred for 24 hours at the temperature of 20° C. The solution was diluted to 0.1% and dialyzed against the mixture (0.1% NaCl, 0.1% NaHCO$_3$) 3×5 liters (once per day) and against distilled water 7×5 liters (twice per day). The resulting solution was then evaporated and analyzed.

DS 28% (determined by NMR, Example 10)

EXAMPLE 12

Reductive Amination of the Oxidized Hyaluronan with Serine

An aqueous solution of the oxidized hyaluronic acid (1%) (0.1 g, oxidation degree DS=30%, Example 4) was mixed with serine (0.3 eq). The mixture was stirred for 1 min at the temperature of 20° C. The solution was then mixed with NaBH$_3$CN (3 eq) in 0.5 ml of water. The mixture was stirred for 24 hours at the temperature of 20° C. The solution was diluted to 0.1% and dialyzed against the mixture (0.1% NaCl, 0.1% NaHCO$_3$) 3×5 liters (once per day) and against distilled water 7×5 liters (twice per day). The resulting solution was evaporated and analyzed.

DS 26% (determined by NMR) $^1$H, HSQC, DOSY NMR (2% NaOD/D$_2$O): δ 2.74 (m, 1H, polymer-CHH—NH—), 3.08 (m, 1H, polymer-CHH—NH—), 3.21 (m, 1H, —CH—CH$_2$—OH), 3.72 (m, 1H, —CH—CHH—OH), 3.78 (m, 1H, —CH—CHH—OH).

EXAMPLE 13

Reductive Amination of the Oxidized Hyaluronan with Arginine

An aqueous solution of the oxidized hyaluronic acid (1%) (0.1 g, oxidation degree DS=30%, Example 4) was mixed with arginine (0.3 eq). The mixture was stirred for 100 hours at the temperature of 20° C. The solution was then mixed with NaBH$_3$CN (3 eq) in 0.5 ml of water. The mixture was stirred for 24 hours at the temperature of 20° C. The solution was diluted to 0.1% and dialyzed against the mixture (0.1% NaCl, 0.1% NaHCO$_3$) 3×5 liters (once per day) and against distilled water 7×5 liters (twice per day). The resulting solution was evaporated and analyzed.

DS 23% (determined by NMR)

$^1$H, HSQC, DOSY NMR (2% NaOD/D$_2$O): δ 1.61 (m, 2H, —CH—CH$_2$—CH$_2$—), 1.63 (m, 1H, —CH—CHH—), 1.70 (m, 1H, —CH—CHH—), 2.65 (m, 1H, polymer-CHH—NH—), 3.01 (m, 1H, polymer-CHH—NH—), 3.13 (m, 1H, —CH—CH$_2$—), 3.21 (m, 2H, —CH—CH$_2$—CH$_2$—).

EXAMPLE 14

Reductive Amination of the Oxidized Hyaluronan with Pentapeptide PAL-KTTKS (palmytoyl-Lys-Thr-Thr-Lys-Ser)

A solution of the oxidized hyaluronic acid (1%) (0.1 g, oxidation degree DS=10%, Example 1) in a water/isopropanol system 2/1 was mixed with a 1% solution of substituted pentapeptide PAL-KTTKS (0.05 eq) in isopropyl alcohol. The mixture was stirred for 24 hours at the temperature of 20° C. The solution was then mixed with NaBH$_3$CN (3 eq) in 0.5 ml of water. The mixture was stirred for 24 hours at the temperature of 20° C. The solution was diluted to 0.1% and dialyzed against the mixture (0.1% NaCl, 0.1% NaHCO$_3$)

3×5 liters (once per day) and against distilled water 7×5 liters (twice per day). The resulting solution was evaporated and analyzed.

DS 8% (determined by NMR)

$^1$H, HSQC, DOSY NMR (2% NaOD/D$_2$O): δ 1.61 (m, 2H, —CH—CH$_2$—CH$_2$—), 1.63 (m, 1H, —CH—CHH—), 1.70 (m, 1H, —CH—CHH—), 2.65 (m, 1H, polymer-CHH—NH—), 3.01 (m, 1H, polymer-CHH—NH—), 3.13 (m, 1H, —CH—CH$_2$—), 3.21 (m, 2H, —CH—CH$_2$—CH$_2$—CH$_2$—).

The invention clamed is:

1. A method of preparation of a hyaluronic acid derivative, oxidized at a position 6 of a glucosamine part to an aldehyde according to a formula X, and its hydrated geminal diol form according to a formula Y:

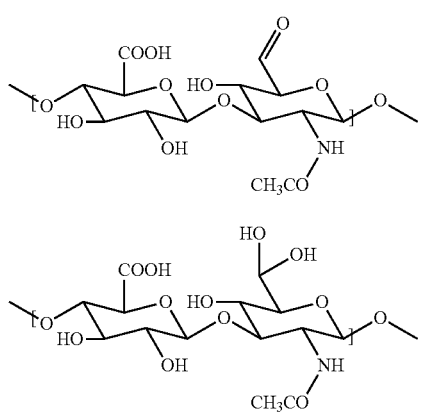

comprising reacting the hyaluronic acid with Dess-Martin periodinane (DMP) in a polar aprotic solvent.

2. The method of preparation of claim 1, wherein the hyaluronic acid is in the form of a free acid or a salt.

3. The method of preparation of claim 1, wherein the hyaluronic acid molecular weight is within the range from $1.10^4$ to $5.10^6$ g.mol$^{-1}$.

4. The method of preparation of claim 1, wherein the reaction of the hyaluronic acid with Dess-Martin periodinane (DMP) is performed at the temperature within the range from 10 to 50° C. for 5 minutes to 150 hours.

5. The method of preparation of claim 1, wherein DMP is present in an amount within the range from 0.05 to 1 molar equivalent with respect to the hyaluronic acid.

6. The method of preparation of claim 1, further comprising modifying the derivative by reacting the oxidized hyaluronic acid derivative with either a compound of the general formula H$_2$N—R, where the general formula H$_2$N—R defines an amino acid, peptide, or polysaccharide containing a free amino group or where R is a linear or branched C$_1$-C$_{30}$ alkyl chain, optionally containing aromatic or heteroaromatic groups, thereby defining an amine, or with a hyaluronan substituted by a —R—NH$_2$ group, wherein R is a linear or branched C$_1$-C$_{30}$ alkyl chain, optionally containing aromatic or heteroaromatic groups, to form an imino form of HA of a general formula I

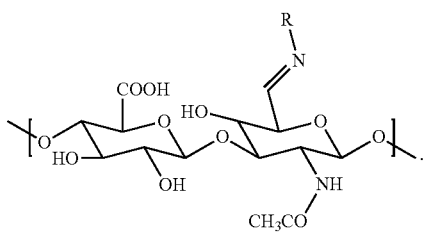

7. The method of preparation according to claim 6, wherein the oxidized hyaluronic acid derivative reacts with the amine, the amino acid, the peptide, or the polysaccharide containing a free amino group.

8. The method of preparation according to claim 7, wherein the oxidized hyaluronic acid derivative reacts with the amine, the amino acid, the peptide, or the polysaccharide containing a free amino group and the amount of the amine, the amino acid, the peptide, or the polysaccharide containing a free amino group is within the range from 0.05 to 10 molar equivalents with respect to the hyaluronic acid derivative.

9. The method of preparation according to claim 7, wherein the oxidized hyaluronic acid derivative reacts with the amine, the amino acid, the peptide, or the polysaccharide containing a free amino group and the reaction of the oxidized hyaluronic acid derivative with the amine, the amino acid, the peptide, or the polysaccharide containing a free amino group is performed in water or in a water-organic solvent system at the temperature within the range from 0 to 80° C. for 1 minute to 24 hours.

10. The method of preparation according to claim 9, wherein the reaction of the oxidized hyaluronic acid derivative with the amine, the amino acid, the peptide, or the polysaccharide containing a free amino group is performed in the presence of NaBH$_3$CN as a reduction agent, which is added to the reaction mixture in time of 0 to 100 hours after the addition of the amine, the amino acid, the peptide, or the polysaccharide containing a free amino group, to form an amino form of HA of a general formula II

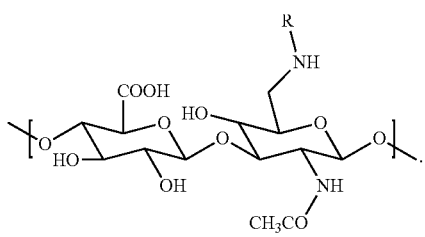

11. The method of preparation according to claim 10, wherein the amount of NaBH$_3$CN as the reduction agent is within the range from 0 to 20 molar equivalents with respect to the molar amount of the aldehyde or geminal diol.

12. The method of preparation according to claim 9, wherein the organic solvent is selected from the group comprising water-miscible alcohols and water-miscible polar aprotic solvents.

13. The method of preparation according to claim 9, wherein the amount of water is at least 50% (v/v) with respect to the volume of the whole solution.

* * * * *